United States Patent
Downing et al.

(10) Patent No.: US 10,678,487 B2
(45) Date of Patent: Jun. 9, 2020

(54) OUTPUT BINS WITH ADJUSTABLE OFFSET POSITIONS

(71) Applicant: HEWLETT-PACKARD DEVELOPMENT COMPANY, L.P., Houston, TX (US)

(72) Inventors: Elliott Downing, Vancouver, WA (US); Cristopher Royce Jansson, Vancouver, WA (US); Robert Yraceburu, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/013,732

(22) Filed: Jun. 20, 2018

(65) Prior Publication Data

US 2019/0391768 A1    Dec. 26, 2019

(51) Int. Cl.
*G06F 3/12* (2006.01)
*G06K 15/00* (2006.01)

(52) U.S. Cl.
CPC ............ *G06F 3/1234* (2013.01); *G06F 3/121* (2013.01); *G06K 15/404* (2013.01)

(58) Field of Classification Search
IPC .................. G06F 3/1234,3/121; G06K 15/404
See application file for complete search history.

(56) References Cited

U.S. PATENT DOCUMENTS

| | | | |
|---|---|---|---|
| 7,891,661 B2 | 2/2011 | Obuchi | |
| 9,174,819 B2 | 11/2015 | Sekizuka | |
| 2011/0261409 A1* | 10/2011 | Mo | B41J 13/0036 358/1.15 |
| 2015/0145201 A1* | 5/2015 | Miyajima | B65H 43/06 271/215 |
| 2015/0147153 A1* | 5/2015 | Ishizuka | B65H 31/10 414/802 |
| 2015/0151945 A1 | 6/2015 | Kuroda | |
| 2015/0166292 A1* | 6/2015 | Sekizuka | B65H 31/00 271/214 |
| 2015/0314978 A1* | 11/2015 | Miyajima | B41J 29/38 271/298 |
| 2018/0227448 A1* | 8/2018 | Nito | H04N 1/00602 |
| 2018/0284678 A1* | 10/2018 | Miyamoto | B41J 29/00 |
| 2018/0348770 A1* | 12/2018 | Yasui | G05D 1/0214 |

FOREIGN PATENT DOCUMENTS

| | | |
|---|---|---|
| JP | 11334970 | 12/1999 |
| JP | 2015218020 | 12/2015 |

\* cited by examiner

*Primary Examiner* — Helen Zong
(74) *Attorney, Agent, or Firm* — HP Inc. Patent Department

(57) ABSTRACT

An example of apparatus to adjust an offset is provided. The apparatus also includes a printing device to generate a plurality of print jobs. The apparatus also includes an output bin to catch the plurality of print jobs. The apparatus includes a motor to move the output bin, wherein the output bin alternates between a first position and a second position between each print job of the plurality of print jobs. The apparatus also includes a controller to control the motor, wherein the controller is to update the position data based on the sensor data to provide uninterrupted operation of the printing device after the sensor detects the obstacle.

15 Claims, 7 Drawing Sheets

OUTPUT BINS WITH ADJUSTABLE OFFSET POSITIONS

BACKGROUND

Imaging devices, such as printers, generate output which may be collected in a bin. For example, ink may be deposited on various types of media to generate documents, which are collected in a bin for subsequent retrieval by a user. In some devices, multiple sets of output are generated by a user or by multiple users. To separate the sets of output for the user, the bin may offset between each set of output to provide discrete stacks for retrieval.

BRIEF DESCRIPTION OF THE DRAWINGS

Reference will now be made, by way of example only, to the accompanying drawings in which.

DETAILED DESCRIPTION

Imaging apparatus, such as print systems, may generate output based on print jobs and deposit the output into an output bin. In some examples, the output bin may move by a predetermined offset amount, such as between print jobs to generate stacks of output on the output bin. The movement of the output bin is generally provided using a motor to provide motion in an electro-mechanical system, such as an actuator. The motor may be programmed to offset the output bin between multiple positions. Accordingly, if the output bin encounters an obstacle, the motor may stall and cause damage to reduce the life of the motor. In such systems, failsafe mechanisms are either built into the software controlling the motor or failsafe mechanisms may be mechanically implemented. Such failsafe mechanisms typically determine if the full range of motion of the output bin is impeded. If an obstacle is detected, the failsafe mechanisms generally stop the print system and generate an error message requiring user intervention to address the obstacle. In some systems with multiple output bins, a fault detected at one output bin may stop the print system from outputting to the output bin with the fault while continuing normal operations at other output bins and/or redirecting print jobs from the stopped output bin to other output bins.

Figure 1:
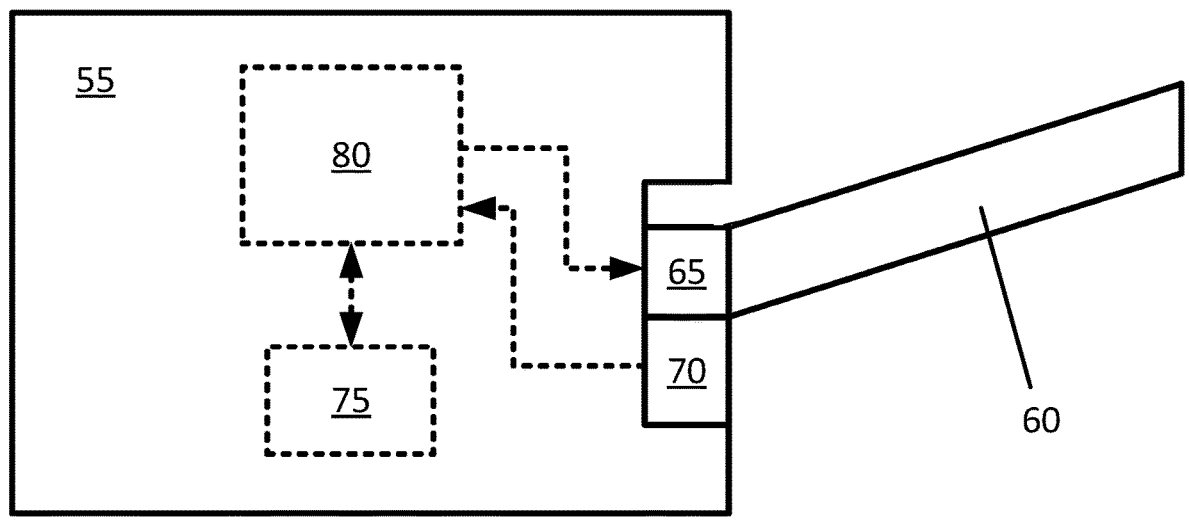
FIG. 1 is a block diagram of an example apparatus to adjust offset positions of output bins.
Figure 1:
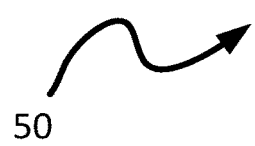

Referring to FIG. 1, an apparatus is generally shown at 50. The apparatus 50 is to adjust an offset position of an output bin during the generation of a plurality of print jobs to a user. In the present example, the apparatus 50 includes a printing device 55, an output bin 60, a motor 65, a sensor 70, a memory storage unit 75, and a controller 80.

The printing device 55 is to generate a plurality of print jobs. The printing device 55 is not particularly limited and may include any assembly to generate an image on a media, such as paper. In the present example, a print job may refer to the output by the printing device 55. In particular, a print job may be a document or a series of documents sent to the printing device 55 from a user. Accordingly, the size of a print job is not limited. For example, the print job may be a single page or multiple pages. In some examples, a print job may be limited to a predetermined number of pages.

The manner by which the printing device 55 generates the print jobs is not limited and may include various mechanisms. For example, the printing device 55 may include a print head or fluid ejection device which ejects drops of print fluid through a plurality of orifices or nozzles onto the media. In other examples, the printing device 55 may interact with a thermally reactive media to generate the image.

The output bin 60 is to receive the plurality of print jobs generated by the printing device 55. In the present example, the output bin 60 is a tray with a floor onto which the print jobs may be deposited. In addition, the output bin 60 may be capable of moving between two positions while print jobs are being generated, such as the positions shown in FIG. 2A and FIG. 2B (e.g., moving in substantially horizontal directions).

It is to be appreciated that manner by which the output bin 60 receives the print jobs is not particularly limited. For example, the printing device 55 may generate print jobs at a fixed outlet from which media exits the printing device 55. The output bin 60 may be positioned below the outlet to catch media that is ejected from the outlet and falls onto the floor of the output bin 60. In some examples, the proximity of the output bin 60 to the outlet of the printing device may also be adjusted such that the floor of the output bin 60 is less than a predetermined distance. By reducing the distance that the media falls, a stack of output may be formed where the edges are more uniform since the perpendicular movement of the media as it falls from the outlet will be reduced. In further examples, the output bin 60 may also be moved lower from the outlet as print jobs are being generated by the printing device 55 and received by the output bin 60 to form stack of media which may approach the outlet. In these examples, the manner by which the output bin 60 is lowered is not particularly limited and may involve counting pages our using a stack sensor (not shown) to determine when the output bin 60 is to be lowered.

Figure 2A:
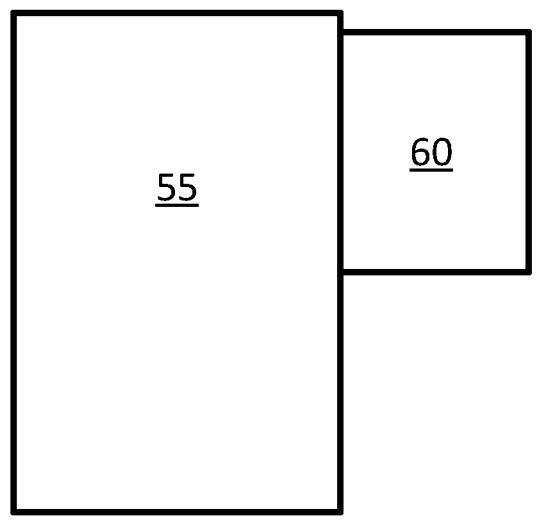
FIGS. 2A-B are top view diagrams of the apparatus showing (a) a first position; and (b) a second position.
Figure 2B:
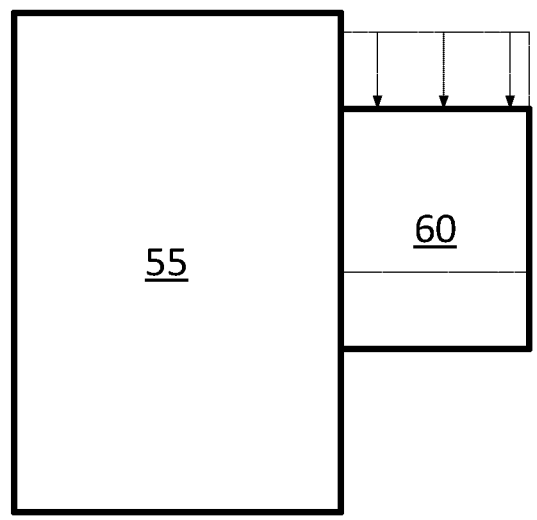

The motor 65 is to move the output bin 60 between multiple positions. In the present example, the motor 65 moves the output bin 60 from a first position as shown in FIG. 2A to a second position as shown in FIG. 2B. The motor 65 may also move the output bin 60 from the second position shown in FIG. 2B back to the first position as shown in FIG. 2A. In the present example, the motor 65 alternates the output bin 60 between the first position (FIG. 2A) and the second position (FIG. 2B). For example, the output bin 60 may be moved between each print job generated by the printing device 55 to facilitate the separation of print jobs.

The manner by which the motor 65 moves the output bin 60 is not particularly limited. In the present example, the motor 65 may be any type of electric motor capable of moving the output bin 60, such as DC brushed motors, DC brushless motors, or stepper motors. In some examples, the motor 65 may be substituted with multiple motors to provide more power or in the case where the motor 65 is unidirectional, opposing motors may be used to move the output bin 60 between the first position (FIG. 2A) and the second position (FIG. 2B).

The sensor 70 is to detect an obstacle that interferes with the movement of the output bin between the first position (FIG. 2A) and the second position (FIG. 2B). The manner by which the sensor 70 detects the obstacle is not particularly limited and may include various types of sensors and methods. It is to be appreciated that the obstacle is not particularly limited. For example, obstacles may include anything obstructing the movement of the output bin 60 including a physical object in a path, a mechanical failure or debris buildup impeding movement of the output bin 60.

In the present example, the sensor 70 may be an internal sensor. For example, the sensor 70 may be used to monitor the motor 65 to detect a motor stall event. In this example, it is to be understood that in the motor stall event may occur when the output bin 60 makes contact with the obstacle that prevents the output bin 60 from completing the movement to either of the first position or the second position in the present example. Accordingly, when the motor 65 stalls, it is to be appreciated that the motor 65 draws a higher current. Therefore, the motor stall event may be detected using an ammeter to monitor the current to the motor 65. When the current is detected to be above a predetermined threshold current, the motor 65 may be deemed to be stalled by an obstacle. Accordingly, the offset functionality of the output bin 60 is to be reduced unless the reduction provides little or no benefit to the user retrieving the print jobs from the output bin 60.

In other examples, the sensor 70 may be a motor encoder used to determine the angular position of the motor 65 to determine if the output bin 60 reaches the first position (FIG. 2A) or the second position (FIG. 2B). In this example, the angular position of the motor 65 may be known for each of the first position (FIG. 2A) and the second position (FIG. 2B). If the motor 65 fails to reach one of the first position (FIG. 2A) or the second position (FIG. 2B), the motor encoder will make a determination that an obstacle has been detected.

In another example of an internal sensor, the sensor 70 may be a tray encoder used to determine the position of the output bin 60 to determine if the output bin 60 reaches the first position (FIG. 2A) or the second position (FIG. 2B). In this example, the position of the output bin may be known for each of the first position (FIG. 2A) and the second position (FIG. 2B). Accordingly, if the output bin 60 fails to reach one of the first position (FIG. 2A) or the second position (FIG. 2B), the tray encoder will make a determination that an obstacle has been detected.

In further examples, the sensor 70 may also be an external sensor to detect the obstacle. For example, the sensor 70 may include a force sensor mounted at a location on the output bin 60, such as a leading edge. In this example, the sensor 70 may detect a force when the output bin 60 contacts an obstacle. It is to be appreciated that additional force sensors may be included and mounted at various locations on the output bin to provide increased ability to detect obstacles.

As another example of an external sensor, the sensor 70 may be an optical system or a sonic proximity detection system used to detect an obstacle prior to having the output bin 60 make contact with the obstacle. For example, the optical system may include a camera or other imaging device to collect data from the environment. After the data is collected by the optical system, the image may be processed using optical recognition techniques to determine there is an obstacle in the path of the output bin 60 prior to contacting the obstacle with the bin. Accordingly, the optical system or a sonic proximity detection system reduces the likelihood of damage to the output bin 60 when it makes contact with the obstacle, such as crashing into the obstacle.

The memory storage unit 75 is to store position data and sensor data and may include a non-transitory machine-readable storage medium that may be any electronic, magnetic, optical, or other physical storage device. In the present example, the memory storage unit 75 may be used to maintain a database for storing the position data and the sensor data. The memory storage unit 75 may also be used to store executable instructions for a processor. For example, the memory storage unit 75 may include instructions to operate the various components of the apparatus 50, such as instructions to cause the motor 65 to move the output bin 60 between the positions discussed above. In addition, the memory storage unit 75 may include instructions receive signals from the sensor 70 and to process the signals received from the sensor 70 to calculate new positions for the limits to the range of motion of the output bin 60. Furthermore, in some examples, the controller 80 may share the same processor of the printing device 55.

The non-transitory machine-readable storage medium may include, for example, random access memory (RAM), electrically-erasable programmable read-only memory (EEPROM), flash memory, a storage drive, an optical disc, and the like. The memory storage unit 75 may also store an operating system that is executable by the controller 80 to provide general functionality to the apparatus 50, including functionality to support applications on the apparatus. Examples of operating systems include Windows™ MacOS™ OS™ Android™, Linux™, and Unix™. The memory storage unit 75 may additionally store applications that are executable by a processor to provide specific functionality.

In the present example, the position data stored in the memory storage unit 75 may be used to define a position of the output bin 60. For example, the position data may be used to identify the first position (FIG. 2A) and the second position (FIG. 2B) of the output bin 60. The manner by which the position data is stored is not limited. For example, the position data may be a pair of numbers to identify the first position (FIG. 2A) and the second position (FIG. 2B) using index numbers to represent the range of position long the axis of motion of the output bin 60. During the operation of the apparatus 50, it is to be appreciated that the position data may be updated by the controller 80 during operation to alter the limits of motion of the output bin 60.

The sensor data stored in the memory storage unit 75 may be used to identify the location of an obstacle during movement of the output bin 60 based on information received from the sensor 70. For example, the sensor data may be used to indicate a position and the direction which the output bin 60 was moving when the sensor 70 detected the obstacle. The manner by which the position data is stored is not limited. For example, the sensor data may include a directional flag and a number to identify the position of the obstacle using index numbers to represent the position long the axis of motion of the output bin 60.

The controller 80 is in communication with the various components of the apparatus 50. In the present example, to controller 80 may control the motor 65 and direct it to move the output bin 60 between the first position (FIG. 2A) and the second position (FIG. 2B) between print jobs. In addition, when the sensor 70 detects an obstacle, the controller 80 may update the position data stored in the memory storage unit 75 based on the sensor data, such as the location of the obstacle. By updating the position data in the memory storage unit 75, the range of motion of the output bin 60 is effectively reduced such that the obstacle is no longer obstructing the motion of the output bin 60. It is to be appreciated that this may provide for uninterrupted operation of the printing device 55 after the sensor 70 detects an obstacle without any user intervention.

In the present example, the controller 80 updates the position data by effectively reducing the range of motion of the output bin 60 to avoid contacting the obstacle. It is to be appreciated that by reducing the range of motion, the output bin 60 may continue to alternate positions between the print jobs received from the printing device 55 without interruption, such as with an error code stoppage. However, it is to be appreciated that by reducing the range of motion, the separation between the stacks of output in the output bin 60 is also reduced. In some examples, when the distance between the end positions of movement of the output bin 60 is below a threshold limit, the controller 80 may stop the output bin 60 from alternating between the two positions since the offset between each stack may be negligible.

In other examples, the controller 80 may also increase the range of motion of the output bin 60 once the obstacle is no longer detected as will be discussed in greater detail below.

Figure 3:
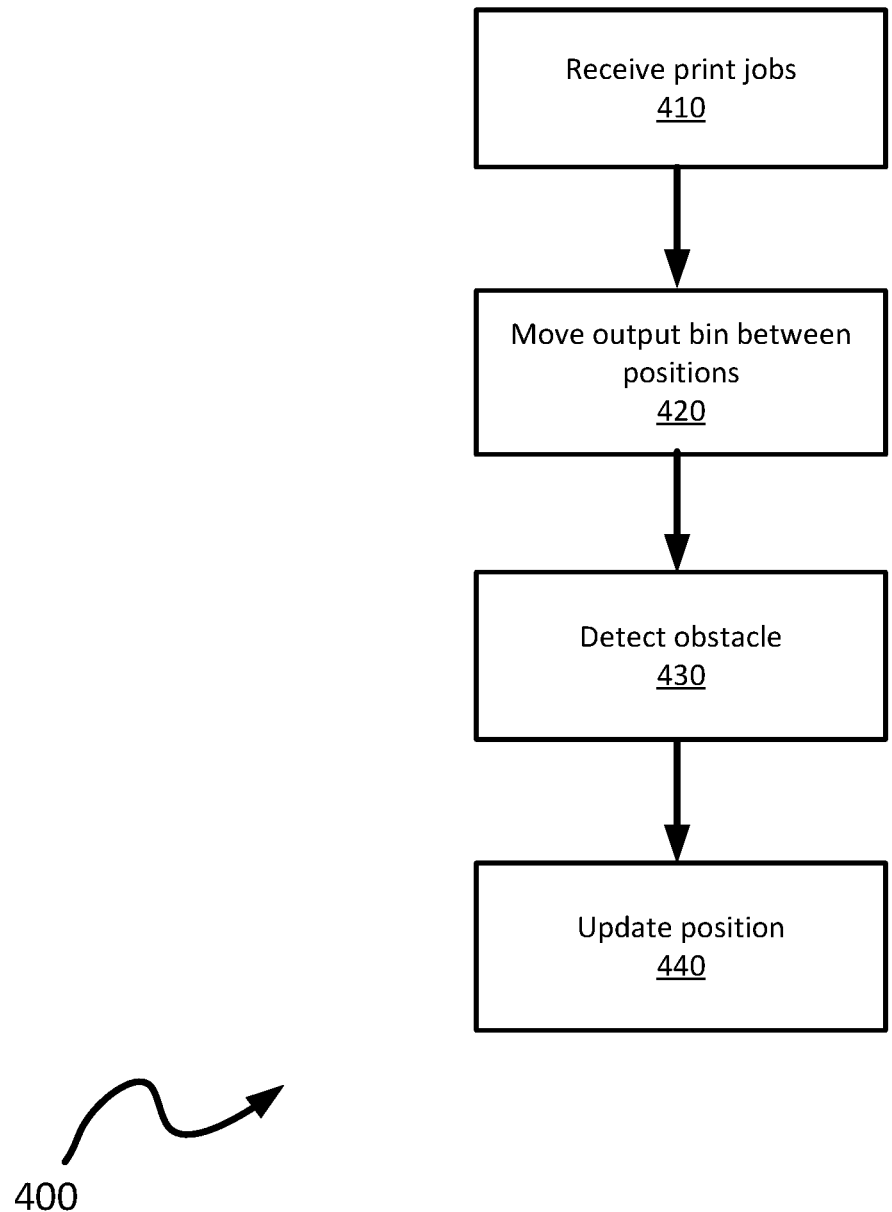
FIG. 3 is a flowchart of an example method of adjusting offset positions of output bins.

Referring to FIG. 3, a flowchart of adjusting an offset position of an output bin in an apparatus is shown at 400. In order to assist in the explanation of method 400, it will be assumed that method 400 may be performed with the apparatus 50. Indeed, the method 400 may be one way in which the apparatus 50 may be operated. Furthermore, the following discussion of method 400 may lead to a further understanding of the apparatus 50 along with its various components.

Beginning at block 410, the output bin receives a print job from a plurality of print jobs from the printing device. In the present example, a print job may refer to the output by the printing device 55. In particular, a print job may be a document or a series of documents sent to the printing device 55 from a user. Accordingly, the size of a print job is not limited. For example, the print job may be a single page or multiple pages. In some examples, a print job may be limited to a predetermined number of pages.

In the present example, each print job is received by the output bin 60 in one of two positions. The two positions of the output bin 60 are not particularly limited and may be initially set upon the power-up procedure of the apparatus. Accordingly, the limits of travel of the output bin 60 may be a default setting of the printing device to allow for sufficient separation between print jobs collected in the output bin 60. The limits are generally predetermined to be the maximum range of motion of the output bin 60, which may be determined by the physical characteristics of the mechanism that moves the output bin 60. For example, the output bin 60 may move along a finite track having mechanical stops at either end to prevent the output bin 60 from travelling too far and falling off the track. In some examples, the offset distance between the two positions may be about 25 millimeters. It is to be appreciated that the distance may be varied such that it is greater than or less than 25 millimeters. In addition, the offset distance may be dependent on the type and size of the media to provide appropriate separation between the print jobs.

Next, at block 420, the output bin 60 moves from one position to the other position after each print job from the printing device 55 is received. The manner by which the output bin 60 is moved between positions is not particularly limited. Continuing with the example above, the output bin 60 may move along the track from one mechanical stop to the next mechanical stop. The positions of the mechanical stops may be stored in the memory storage unit 75. In the present example, the motor 65 is a bidirectional motor that may move the output bin 60 from the first position as shown in FIG. 2A to the second position as shown in FIG. 2B. By reversing direction, the motor 65 may also move the output bin 60 from the second position (FIG. 2B) back to the first position (FIG. 2A). Accordingly, the output bin 60 may alternate between the first position and the second position between each print job generated by the printing device 55. In other examples, the motor 65 may be a unidirectional motor where a second motor may be used to return the output bin 60 to the first position from the second position. In further examples, additional motors may also be added to provide for additional ranges or directions of motion for the output bin 60.

At block 430, the sensor 70 is to detect an obstacle that may interfere with the motion of the output bin 60 between the positions described above. It is to be appreciated that the obstacle is not particularly limited. For example, obstacles may include anything obstructing the movement of the output bin 60 including a physical object in the path of motion, a mechanical failure or debris buildup impeding movement of the output bin 60.

In the present example, the sensor 70 may be an internal sensor to monitor the operation of the motor 65, such as to determine whether the motor 65 has stalled as a result to the output bin 60 being prevented from moving due to an obstacle obstructing or interfering with the path of motion. Accordingly, when the motor 65 stalls, it is to be appreciated that the motor 65 draws a higher current. Therefore, a motor stall event may be detected using an ammeter to monitor the current to the motor 65. In another example, the sensor 70 may monitor the motion of the motor 65 and detect that the motor 65 has stopped moving at an unexpected position or that the output bin 60 is stopped moving at an unexpected location, both of which may indicate a motor stall event.

In further examples, detection of an obstacle maybe carried out with an external sensor to detect the obstacle. For example, the sensor 70 may be an optical system or a sonic proximity detection system used to detect an obstacle prior to having the output bin 60 make contact with the obstacle. For example, the optical system may include a camera or other imaging device to collect data from the environment. After the data is collected by the optical system, the image may be processed using optical recognition techniques to determine there is an obstacle in the path of the output bin 60 prior to contacting the obstacle with the bin. It is to be appreciated that by detecting the obstacle prior to making contact with the obstacle, potential damage to the output bin 60 may be reduced.

Block 440 involves the controller 80 updating a position that defines one of the limits of the range of motion to provide uninterrupted operation of the printing device 55 for the remaining print jobs to be printed subsequent to the output bin 60 encountering the obstacle. To provide uninterrupted operation, the controller 80 adjusts the range of motion of the output bin 60 to avoid further contact with the obstacle that has been introduced during the generation of the plurality of print jobs. In particular, the controller 80 may reduce the range of motion. It is to be appreciated that by reducing the range of motion, the output bin 60 may continue to alternate positions between the print jobs received from the printing device 55 without interruption, such as with an error code stoppage. However, it is to be appreciated that by reducing the range of motion, the separation between the stacks of output in the output bin 60 is also reduced. In some examples, when the distance between the end positions of movement of the output bin 60 is below a threshold limit, such as less than 6 millimeters, the controller 80 may stop the output bin 60 from alternating between the two positions since the offset between each stack may be negligible.

In examples where ongoing monitoring of the surroundings of the output bin 60 are carried out, the controller 80 may also increase the range of motion of the output bin 60 once the obstacle is no longer detected to restore the original range of motion. For example, if the sensor 70 is an internal sensor, the output bin 60 may be periodically used to probe the limits of travel to determine if the obstacle is still present. If the output bin 60 is able to move the original range or a larger range without interference, the controller 80 may update the range of motion. Therefore, the sensor 70 may be used to monitor the obstacle after detection and to increase the range when the obstacle is moved. In examples where the obstacle is removed, the range may be restored to the original range. In other examples, such as where the sensor 70 is capable of detecting ahead of the output bin 60, the presence of the obstacle may be probed with each pass.

Figure 4:
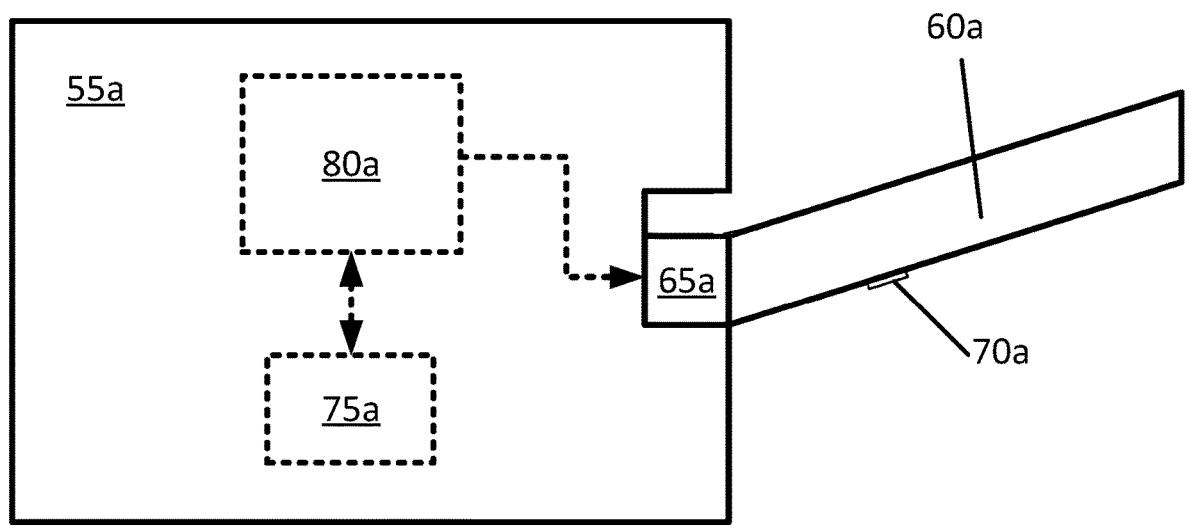
FIG. 4 is a block diagram of another example apparatus to adjust offset positions of output bins.
Figure 4:

Referring to FIG. 4, another apparatus is generally shown at 50a. The apparatus 50a is to adjust an offset position of an output bin during the generation of a plurality of print jobs to a user. Like components of the apparatus 50a bear like reference to their counterparts in the apparatus 50, except followed by the suffix "a". In the present example, the apparatus 50a includes a printing device 55a, an output bin 60a, a motor 65a, a sensor 70a, a memory storage unit 75a, and a controller 80a.

Figure 5A:
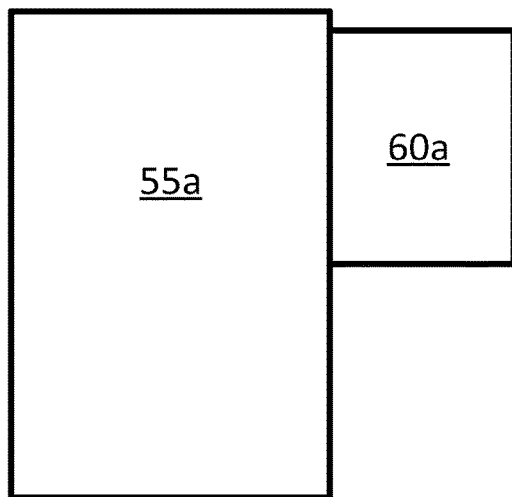
FIGS. 5A-C are top view diagrams of an example of the apparatus of claim show showing (a) a first position; (b) a second position; and (c) a third presentation position.
Figure 5B:
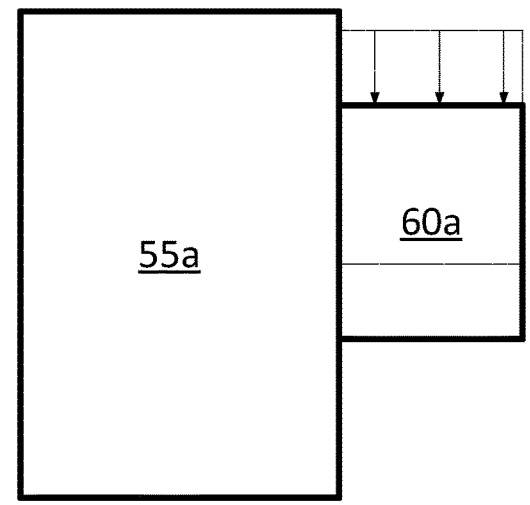
Figure 5C:
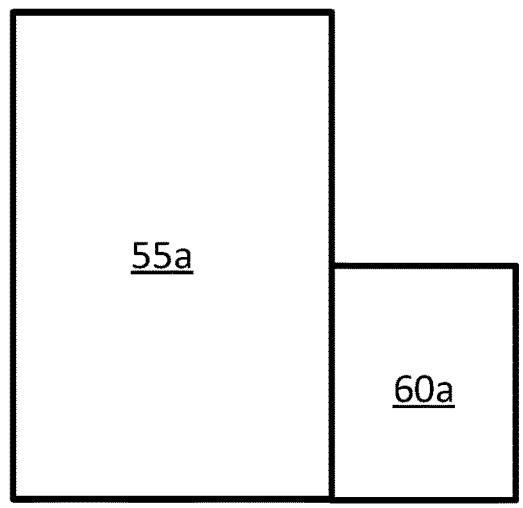

In the present example, the output bin 60a is to receive the plurality of print jobs generated by the printing device 55a. The output bin 60a may be a tray with a floor onto which the print jobs may be received. In addition, the output bin 60a may be capable of moving between two positions while print jobs are being generated by the printing device 55a, such as the positions shown in FIG. 5A and FIG. 5B. In addition, the output bin 60a may also be moved to another position for presentation as shown in FIG. 5C.

In this example, the output bin 60a is moved along the same axis beyond the range of the offset movements while print jobs are being generated. This moves the output bin 60a to an edge, which may be more convenient for the user to retrieve.

Figure 6A:
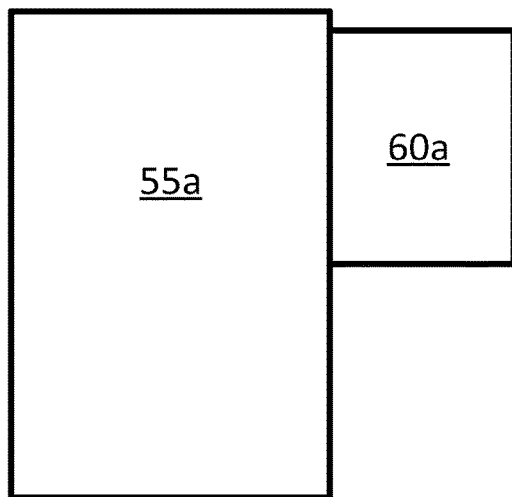
FIGS. 6A-C are top view diagrams of the apparatus of another example of claim show showing (a) a first position; (b) a second position; and (c) a third presentation position.
Figure 6B:
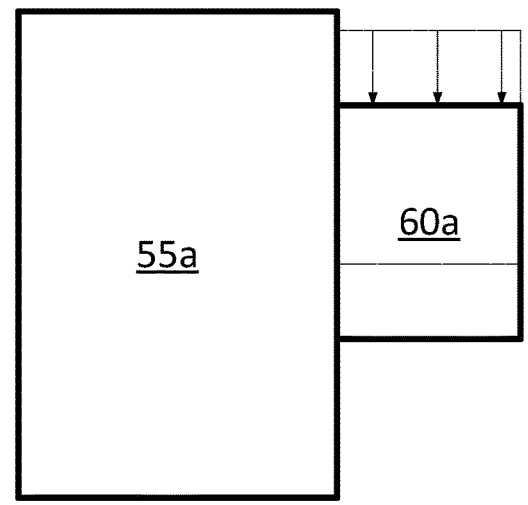
Figure 6C:
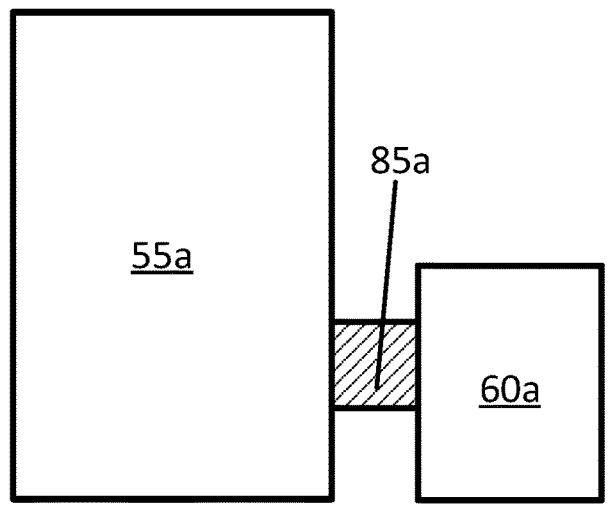

As another example, the output bin 60a is to receive the plurality of print jobs generated by the printing device 55a. The output bin 60a may be a tray with a floor onto which the print jobs may be received. In addition, the output bin 60a may be capable of moving between two positions while print jobs are being generated by the printing device 55a, such as the positions shown in FIG. 6A and FIG. 6B. In addition, the output bin 60a may also be moved to another position for presentation as shown in FIG. 6C.

In this example, the output bin 60a may be extended away from the printing device 55a using an arm 85a to present the plurality of completed print jobs. It is to be appreciated that the third position is not limited and may not involve extending the output bin 60a using the arm 85a. In further examples, the output bin 60a may also be moved in the vertical directly for easier retrieval by a user. It is to be appreciated that when the plurality of print jobs is presented for retrieval, each print job is to be offset to provide a stack of staggered print jobs. By staggering the print jobs, separation of each print job is facilitated.

Although the present example describes the formation of a stack of staggered prints based on movement of the output bin 60a between two positions, other examples may move the output bin 60a between more positions such that the plurality of print jobs will have more offset positions in the final stack of documents.

In the present example, the sensor 70a is an external sensor mounted on the output bin 60a to detect an obstacle that interferes with the movement of the output bin 60a. The manner by which the sensor 70a detects the obstacle is not particularly limited and may include various types of sensor, such as an optical sensor, or a sonic proximity sensor. For example, the optical system may include a camera or other imaging device to collect data from the environment. After the data is collected by the optical system, the image may be processed using optical recognition techniques to determine there is an obstacle in the path of the output bin 60a prior to contacting the obstacle with the bin. Accordingly, the optical system or a sonic proximity detection system reduces the likelihood of damage to the output bin 60a when it makes contact with the obstacle, such as crashing into the obstacle.

Figure 7A:
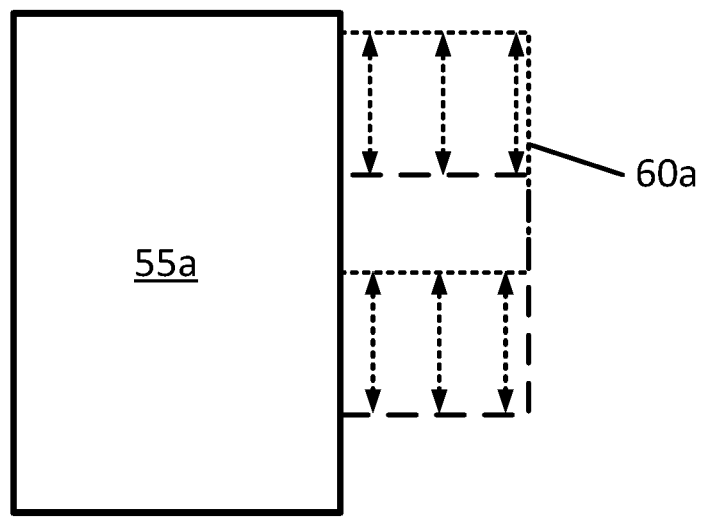
FIGS. 7A-B are top view diagrams of the apparatus showing (a) movement between a full range of motion for an output bin; and (b) movement between a reduced range of motion for an output bin.
Figure 7B:
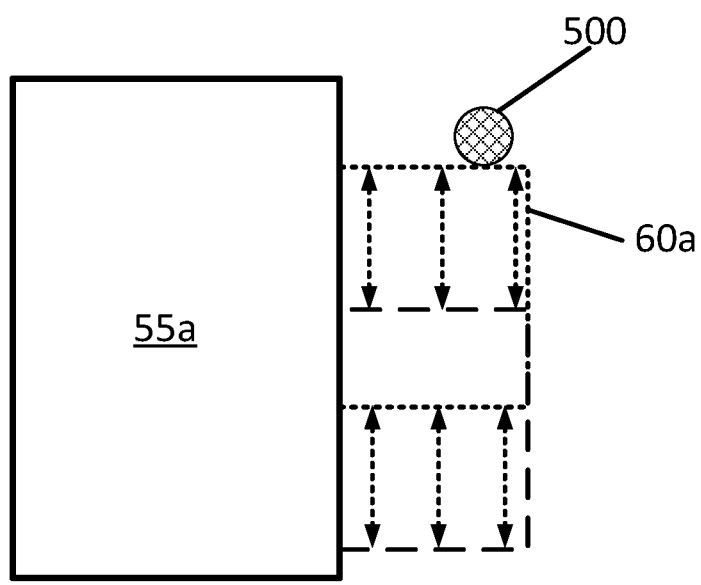

Referring to FIGS. 7A and 7B, the operation of the apparatus 50a is further illustrated. During the generation of print jobs by the printing device 55a, the output bin 60a may be moved between two positions as shown in FIG. 7A. Upon the introduction of an obstacle 500, the output bin 60a may contact the obstacle 500 and be prevented by moving further. Accordingly, the motor 65a will stall since movement of the output bin 60a is impeded. The sensor 70a may detect the stall event or may detect the obstacle 500.

After the detection of the obstacle 500, the controller 80a updates the limits on the range of motion for the output bin 60a and the output bin is allowed to continue moving. In the present example, the range of motion is not reduced as shown in FIG. 7B and instead a portion of the track used to move to the presentation position (FIG. 5C) is used for the offset. This provides continued operation without interruption to the generation of print jobs by the printing device 55a and without reducing the offset distance between each print job. However, it is to be appreciated that the stack formed may be shifted as the print jobs are now received at a different portion of the output bin 60a. In other examples, the offset amount may be reduced to maintain the position of one of the offset limits. This maintains an edge of the stack of print jobs and reduce stack shifting. Accordingly, while moving in the reduced range, it is to be appreciated that the offset of the print jobs received on the output bin 60a are reduced.

It should be recognized that features and aspects of the various examples provided above may be combined into further examples that also fall within the scope of the present disclosure.

What is claimed is:

1. An apparatus comprising:
   a printing device to generate a plurality of print jobs;
   an output bin to receive the plurality of print jobs;
   a motor to move the output bin between a first position and a second position in a substantially horizontal direction, wherein the output bin alternates between the first position and the second position to offset each print job of the plurality of print jobs on the output bin, wherein the first position and the second position define a range of motion;
   a sensor to detect an obstacle arranged to interfere with a movement between the first position and the second position;

a memory storage unit to store position data and sensor data, wherein the position data is to define the first position and the second position, and wherein, the sensor data identifies a location of the obstacle; and, a controller to control the motor, wherein the controller is to update the position data based on the sensor data to reduce the range of motion to provide uninterrupted operation of the printing device after the sensor detects the obstacle.

2. The apparatus of claim 1, wherein the sensor is to detect a motor stall event.

3. The apparatus of claim 2, wherein the sensor is an ammeter to detect a threshold current to identify the motor stall event.

4. The apparatus of claim 1, wherein the sensor is external and to detect the obstacle.

5. The apparatus of claim 4, wherein the sensor is mounted at an edge of the output bin to detect a force from contact with the obstacle.

6. The apparatus of claim 4, wherein the sensor is an optical system to detect the obstacle prior to contact with the output bin.

7. The apparatus of claim 1, wherein the motor is to move the output bin to a third position to present the plurality of print jobs.

8. The apparatus of claim 1, wherein the controller is to stop the motor when the range of motion is below a threshold limit.

9. A method comprising:

receiving a plurality of print jobs from a printing device on an output bin, wherein each print job from the plurality of print jobs is received while the output bin is at one of a first position or a second position;

moving the output bin from the first position to the second position in a substantially horizontal direction after a print job from the plurality of print jobs to offset the print job, wherein the first position and the second position define a range of motion;

detecting an obstacle arranged to interfere with movement of the output bin from the first position to the second position; and updating the second position based on the obstacle to reduce the range of motion to provide uninterrupted operation of the printing device for a set of print jobs from the plurality of print jobs generated after the print job.

10. The method of claim 9, wherein detecting the obstacle comprises detecting threshold current of a motor to identify a motor stall event.

11. The method of claim 9, wherein detecting the obstacle comprises detecting the obstacle prior to contact between the output bin and the obstacle.

12. The method of claim 9, further comprising monitoring the obstacle after detection and restoring the second position upon removal of the obstacle.

13. A non-transitory machine-readable storage medium comprising instructions executable by a processor, the non-transitory machine-readable storage medium comprising:

instructions to move an output bin between a first position and a second position in a substantially horizontal direction, wherein the output bin alternates between the first position and the second position between a first print job and a second print job to offset the first print job from the second print job, wherein the first position and the second position define a range of motion;

instructions to receive a signal from a sensor, wherein the signal is to detect an obstacle, and wherein the obstacle interferes with a movement of the output bin from the first position to the second position; and instructions to update the second position based on the signal to reduce the range of motion to provide uninterrupted generation of a third print job.

14. The non-transitory machine-readable storage medium of claim 13, comprising instructions to move the output bin to a third position to present the first print job, the second print job, and the third print job to a user.

15. The non-transitory machine-readable storage medium of claim 13, comprising instructions to stop the output bin from movement between the first position and the second position when a distance between the first position and the second position is below a threshold limit.

* * * * *